United States Patent
Lagnado et al.

(10) Patent No.: US 9,853,750 B2
(45) Date of Patent: Dec. 26, 2017

(54) ADJUSTING TRANSMISSIONS FROM A WIRELESS COMMUNICATIONS MODULE

(71) Applicant: HEWLETT-PACKARD DEVELOPMENT COMPANY, L.P., Houston, TX (US)

(72) Inventors: Isaac Lagnado, Houston, TX (US); Shih Huang Wu, Houston, TX (US); Mats Anders Krister Luckman, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/501,219

(22) PCT Filed: Sep. 29, 2014

(86) PCT No.: PCT/US2014/057957
§ 371 (c)(1),
(2) Date: Feb. 2, 2017

(87) PCT Pub. No.: WO2016/053229
PCT Pub. Date: Apr. 7, 2016

(65) Prior Publication Data
US 2017/0230123 A1    Aug. 10, 2017

(51) Int. Cl.
*H04B 17/10*       (2015.01)
*H04W 28/10*      (2009.01)
(Continued)

(52) U.S. Cl.
CPC .......... *H04B 17/102* (2015.01); *H04W 24/00* (2013.01); *H04W 28/10* (2013.01);
(Continued)

(58) Field of Classification Search
CPC .... H04B 17/102; H04W 24/00; H04W 28/10; H04W 52/04; H04W 52/14; H04W 52/22; H04W 52/30; H04W 88/02
See application file for complete search history.

(56) References Cited

U.S. PATENT DOCUMENTS

| 8,792,930 B1 | 7/2014 | Gopalakrishnan et al. |
| 2011/0124363 A1 | 5/2011 | Calvarese et al. |

(Continued)

FOREIGN PATENT DOCUMENTS

| EP | 2410661 A1 | 1/2012 |
| WO | WO-2013/165419 A1 | 11/2013 |

OTHER PUBLICATIONS

J. Bach Andersen et al., "Exposure Aspects of New and Evolving Wireless Systems," Aalborg University, Aug. 2007, pp. 1-40, gsmworld.com.

*Primary Examiner* — Raymond Dean
(74) *Attorney, Agent, or Firm* — HP Inc Patent Department

(57) ABSTRACT

Examples disclosed herein control radiation exposure for a wireless computing device. In one example, the wireless computing device monitors for instances of upload transmissions from a wireless communications module of the wireless computing device, performs a running average of the instances of upload transmissions over a period of time, and determines whether the running average exceeds a threshold value. If the running average exceeds the threshold value, the wireless computing device adjusts upload transmissions from the wireless communications module to control the radiation exposure for the wireless computing device.

15 Claims, 4 Drawing Sheets

(51) Int. Cl.
 *H04W 52/22* (2009.01)
 *H04W 88/02* (2009.01)
 *H04W 24/00* (2009.01)
 *H04W 52/14* (2009.01)
 *H04W 52/30* (2009.01)
 *H04W 52/04* (2009.01)

(52) U.S. Cl.
 CPC ........... *H04W 52/14* (2013.01); *H04W 52/22* (2013.01); *H04W 52/30* (2013.01); *H04W 88/02* (2013.01); *H04W 52/04* (2013.01)

(56) References Cited

U.S. PATENT DOCUMENTS

| | | |
|---|---|---|
| 2012/0021800 A1 | 1/2012 | Wilson et al. |
| 2012/0071195 A1 | 3/2012 | Chakraborty et al. |
| 2012/0147801 A1 | 6/2012 | Ho et al. |
| 2012/0257657 A1 | 10/2012 | Subrahmanya et al. |
| 2014/0148211 A1 | 5/2014 | Mountford et al. |
| 2014/0187281 A1 | 7/2014 | Faraone et al. |

ADJUSTING TRANSMISSIONS FROM A WIRELESS COMMUNICATIONS MODULE

BACKGROUND

Wireless computing devices may communicate with other wireless computing devices by exchanging radio frequency (RF) communication signals. As an example, such a wireless computing device may exchange (e.g., transmit and/or receive) RF communication signals by use of a wireless communications module of the wireless computing device. Transmitted power output of the wireless communications module may directly impact wireless performance, with higher transmitted power output limits allowing the wireless computing device to achieve greater throughput and/or broader wireless coverage (e.g., enhanced coverage areas).

DETAILED DESCRIPTION

When a wireless computing device is used in relatively close proximity to a user, the user can be exposed to some amount of electromagnetic (EM) radiation via wireless transmissions of the wireless computing device. To protect users from excessive exposure to EM radiation, government regulatory agencies have set radiation-related thresholds for wireless computing devices to comply with. The wireless transmissions of the wireless computing device are controlled such that exposure to EM radiation is mitigated and do not exceed the radiation-related thresholds. An example of a radiation-related threshold is a specific absorption rate (SAR), which refers to a measure of rate at which RF energy is absorbed by the human body when exposed to EM radiation. SAR can be expressed as power absorbed per mass of tissue (e.g., watts per gram). A government agency can specify a maximum SAR that wireless computing devices have to satisfy. Other types of radiation-related thresholds can include an effective radiated power (ERP) threshold, a maximum permissible exposure (MPE) time threshold, and so forth.

Examples disclosed herein provide the ability for a wireless computing device to monitor for instances of upload transmissions from a wireless communications module of the wireless computing device in order to determine whether the transmissions may provide a level of EM radiation that exceed radiation-related thresholds (e.g., an indication of SAR exposure). The wireless transmissions of the wireless computing device may then be controlled such that exposure to EM radiation is mitigated and do not exceed the radiation-related thresholds. Examples of controlling the wireless transmissions of the wireless computing device include, but are not limited to, reducing the transmitted power output of the wireless communications module and injecting idle times in the upload stream of the wireless communications module (e.g., duty cycling).

Figure 1:
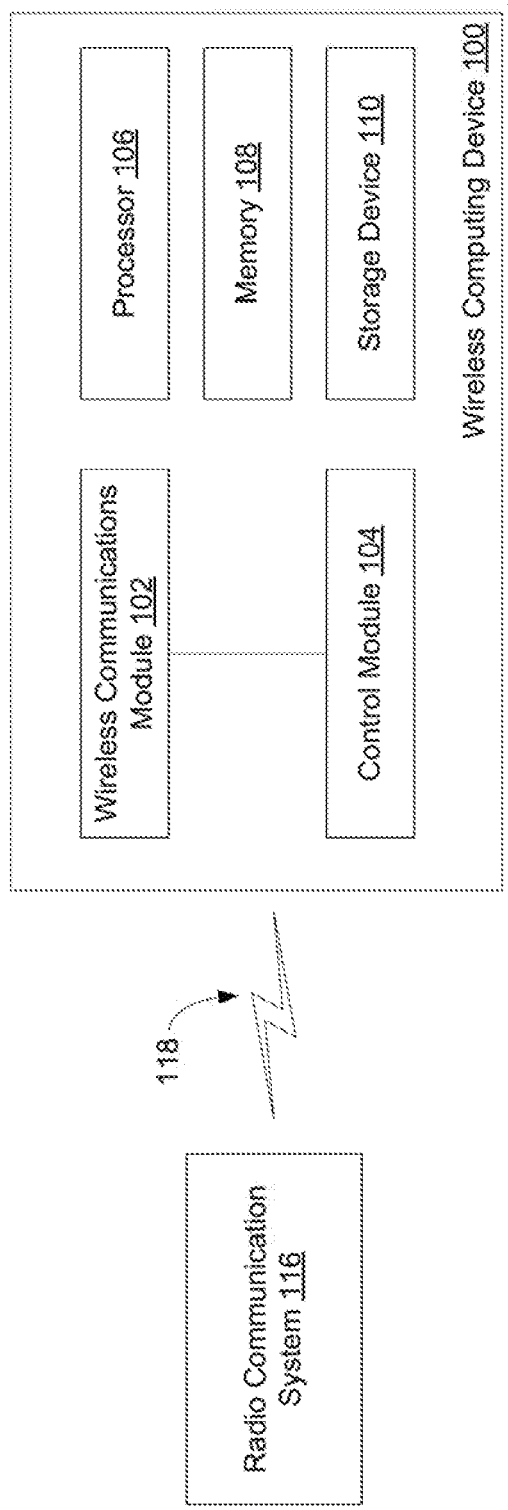
FIG. 1 illustrates a wireless computing device adapted to connect to a radio communication system, according to an example.

With reference to the figures, FIG. 1 is a block diagram illustrating a wireless computing device 100 including a wireless communications module 102 adapted to connect the wireless computing device 100 to a radio communication system 116, according to an example. As an example, the wireless communications module 102 may include an antenna (not illustrated) to allow for transmission and receipt of wireless signals. The wireless communications module 102 can include a transceiver for transmitting and receiving signals. The radio communication system 116 may be a structure disposed remote from the wireless computing device 100, and they may exchange communications with each other via wireless signals 118. in some examples, the radio communication system 116 may be a wireless router, a peripheral computing device adapted to provide a wireless signal, a cell phone station, and the like. The wireless computing device 100 may include one or more wireless communications modules 102 for wirelessly communicating with different radio communication systems, such as a Wi-Fi router and/or a cell phone station.

The wireless computing device 100 may be, for example, a laptop computer, desktop computer, tablet computer, mobile computing device, server, or cellular phone, a wearable computing device, retail point of sale device, gaming device e-reader, or another computing device with wireless transmission capability. The wireless computing device 100 also includes a processor 106 and a storage device 110. The components of the wireless computing device 100 may be connected and communicate through a system bus (e.g., PCI, ISA, PCI-Express, HyperTransport®, NuBus, etc.). The processor 106 can be a single core processor, a multi-core processor, a computing cluster, or any number of other configurations. The processor 106 may be implemented as Complex Instruction Set Computer (CIBC) or Reduced Instruction Set Computer (RISC) processors, x86 instruction set compatible processors, multi-core, or any other microprocessor or central processing unit (CPU). As an example, the main processor 106 includes dual-core processor(s), dual-core mobile processor(s), or the like.

The wireless computing device 100 may include a memory device 108. The memory device 108 can include random access memory (e.g., SRAM, DRAM, zero capacitor RAM, SONOS, eDRAM, EDO RAM, DDR RAM, RRAM, PRAM, etc.), read only memory (e.g., Mask ROM, PROM, EPROM, EEPROM, etc.), flash memory, or any other suitable memory systems. The storage device 110 may be a non-transitory computer-readable storage medium. The storage device 110 may have instructions stored thereon that, when executed by a processing resource, such as the processor 106, cause the wireless computing device 100 to perform operations.

In some examples, the instructions can be part of an installation package that, when installed, can be executed by processing resource(s) to implement the operations. In such examples, the machine-readable storage medium may be a portable medium, such as a CD, DVD, or flash drive, or a memory maintained by a server from which the installation package can be downloaded and installed. In other examples, the instructions may be part of an application, applications, or component already installed on a server including the processing resource. In such examples, the machine-readable storage medium may include memory such as a hard drive, solid state driver, or the like. In other examples, some or all of the functionalities described may be implemented in the form of electronic circuitry.

A used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory.

Referring back to FIG. 1, the operations described above may be executed by a control module 104. The control module 104 can be implemented in hardware, implemented as machine-readable instructions executable on the processor(s) 106 or implemented as a combination of hardware and machine-readable instructions. In examples where the control module 104 is implemented at least in part with machine-readable instructions, these machine-readable instructions can be in the form of software executable on the processor(s) 106, or software or firmware executable by a processor in the wireless communications module 102.

As an example, the control module 104 may monitor for upload traffic of Internet Protocol (IP) packets to assess if the wireless computing device 100 is operating within SAR guideline levels. The IP packets may be monitored via software residing in the network layer (e.g., operating system), which avoids any custom interaction with the hardware or firmware. The network layer also makes it ubiquitous allowing SAR to be monitored and mitigated across any networking device. However, the IP packets may also be monitored via the firmware of the wireless communications module 102, allowing for no platform image or platform hardware impacts. If the wireless computing device 100 is operating over the SAR level limit, the upload traffic may be adjusted in order to operate within SAR guideline levels. Examples of adjusting the upload traffic include, but are not limited to reducing the transmitted power output of the wireless communications module 102 and duty cycling the upload stream of the module 102.

In order to assess whether wireless computing device 100 is operating within SAR guideline levels, the utilization of the wireless communications module 102 for transmitting the upload traffic may be measured over a period of time (e.g., perform a running average of uploaded transmitted power). If the running average of the transmitter power exposure exceeds the SAR level limit, adjustments may be made to operate within the SAR guideline levels (e.g., reducing transmitted power output or duty cycling). As an example, the full transmit power of the module 102 may be used to estimate the utilization of the module 102 for transmitting the upload traffic. However, further optimizations may be utilized to provide a better estimate of the transmitter power exposure. For example, rather than assuming full power of the module 102 when measuring utilization, received signal strength indicator (RSSI) may be used as an indicator of power used for transmitting the upload traffic. For example, the power used for transmitting the upload traffic may be inversely proportional to the RSSI of the wireless computing device 100. In addition, the actual RF power used for transmitting the upload traffic may be used for measuring the utilization of the module 102.

When measuring the utilization of the module 102, although using the full transmit power of the module 102 rather than the actual RF power may provide an overestimate of the utilization, a user may be better safeguarded and the measurement of the utilization may be appropriate. For example, as users of wireless computing device 100 may be primarily download centric, using the full transmit power of the module 102 to estimate utilization still may not exceed the SAR level limit. While using full transmit power to estimate utilization of the module 102, some margin may be applied to account for wireless network retries and wireless network transfer speeds (e.g., assumption that IP packets are transferred at minimum speed, to ensure estimation covers worst case). Additional margins may be applied to account for wireless management handshakes that may not be associated with any IP data traffic. For example, some frames may be transmitted to maintain the wireless link (e.g., management overhead). As mentioned above, although using full transmit power may provide an overestimate of the utilization of the module 102, a user may be better safeguarded.

As an example, the operations described above be executed by logic at least partially comprising hardware logic. Hardware logic at least partially includes hardware, and may also include software, or firmware. Hardware logic may include electronic hardware including interconnected electronic components to perform analog or logic operations on the wireless computing device 100. Electronic hardware may include individual chips/circuits and distributed information processing systems. The operations may include adjusting transmissions from the wireless communications module 102 to control radiation exposure for the wireless computing device 100

Figure 2:
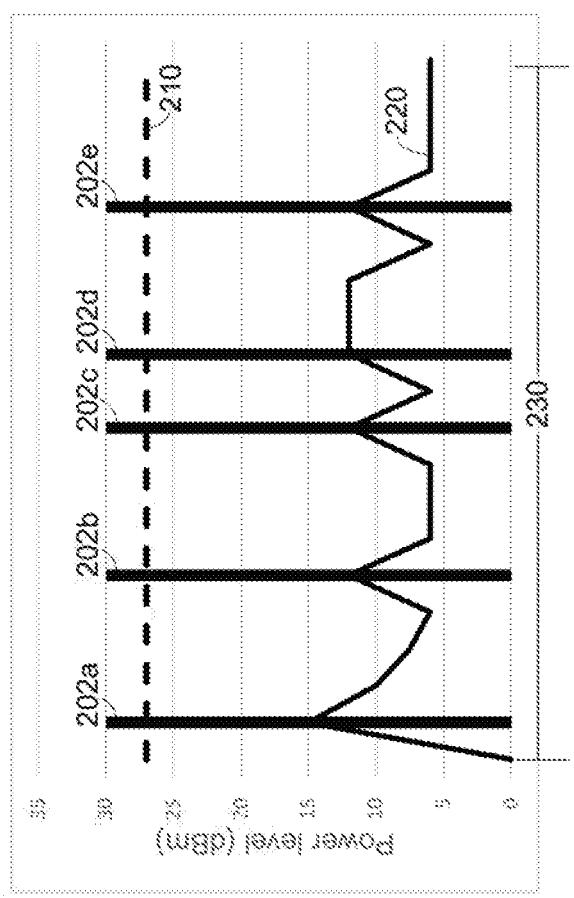
FIGS. 2-3 provide example illustrations of the instances of upload transmissions from a wireless communications module of the wireless computing device within a pre-defined time interval, according to examples.

FIG. 2 provides an example illustration of the instances of upload transmissions from the wireless communications module 102 within a predefined time interval 230, according to an example. The transmit power level of the module 102 may be used for measuring the utilization of the module 102 over the predefined time interval 230. As described above, the full transmit power of the module 102 may be used to estimate the utilization (e.g., 30 dBm, as illustrated). However, other factors may be utilized for providing an estimate of the transmitter power exposure (e.g., RSSI; actual RF power). The predefined time interval 230 can be of any predefined length of time. As an example, the predefined time interval 230 can be the time interval associated with SAR measurements (e.g., 6 minutes). In other examples, other predefined time intervals can be used.

As air example, user traffic (e.g., web browsing, email) consists of somewhat random brief bursts of network activity followed by longer periods of idle times. The brief bursts of network activity may correspond to wireless transmissions from the wireless communications module 102. Referring to FIG. 2, the brief bursts of network activity may correspond to instances of upload transmissions from the wireless communications module 102 at periods 202a-202e. The periods in between periods 202a-e may indicate periods when the wireless, communications module 102 is not wirelessly transmitting upload transmissions.

Referring to FIG. 2, periods corresponding to the brief bursts of network activity (periods 202a-e) may exceed a threshold value 210. Threshold value 210 may be indicative of a power level where wireless transmissions from the wireless communications module 102 may violate a radiation-related threshold. However, a running average 220 of the utilization of the wireless communications module 102, represented by periods 202a-e and the periods in between, remains below the threshold value 210, as illustrated. Therefore, although there are periods when the wireless transmissions exceed the threshold value 210 (e.g., periods 202a-e), since the roiling average 220 of the utilization of the module 102 does not exceed the threshold value 210, the wireless transmissions from the wireless communications module 102 may not expose users to high levels of RF power. As a result, the transmissions from the wireless communications module 102 may not have to be adjusted to control the radiation exposure for the wireless computing device 100. The period for the rolling average 220 may correspond to the predefined time interval 230 (e.g., time interval associated with SAR measurements).

Figure 3:
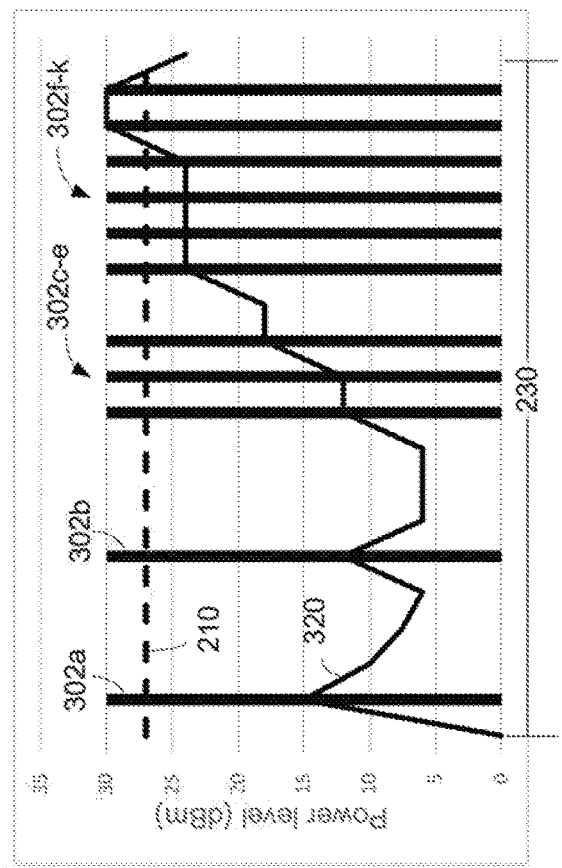

As an example, user traffic may include greater network activity than what is illustrated in FIG. 2. As an example, a computing device that is actively uploading data may have to transmit more often, potentially exposing users to higher levels of RF power. FIG. 3 provides an example illustration of the instances of upload transmissions from the wireless communications module 102 of the wireless computing device 100 within a predefined time interval 230, according to an example. The predefined time interval 230 can be of any predefined length of time. As an example, the predefined time interval 230 can be the time interval associated with SAR measurements (e.g., 6 minutes). In other examples, other predefined time intervals can be used.

Referring to FIG. 3, the wireless computing device 100 may include greater network activity than what is illustrated in FIG. 2. The network activity may correspond to instance of upload transmissions from the wireless communications module 102 at periods 302a-k. The periods in between periods 302a-k may indicate periods when the wireless communications module 102 is not wirelessly transmitting upload transmissions.

Referring to FIG. 3, periods corresponding to the network activity (e.g., periods 302a-k) may exceed a threshold value 210. As described above, threshold value 210 may be indicative of a power level where wireless transmissions from the wireless communications module 102 may violate a radiator-related threshold. in addition to having periods that exceed threshold value 210, a running average 320 of the utilization of the wireless communications modules 102, represented by periods 302a-k and the periods in between, may also exceed the threshold value 10, as illustrated. As a result, the wireless transmissions from the wireless communications module 102 may expose users to high levels of RF power. Therefore, the control module 104 may trigger reductions in RF power by adjusting the wireless transmissions from the wireless communications module 102 to control the radiation exposure for the wireless computing device 100.

Examples of adjusting the wireless transmissions of the wireless computing device 100 include, but are not limited to, reducing the actual transmitted power output of the wireless communications module 102 and injecting idle times in the upload stream of the wireless communications module 102 (e.g., duty cycling). Upon adjusting the wireless transmissions, the running average 320 may fall below the threshold value 210, reducing user exposure to high RF power levels and mitigating SAR exposure.

The duty cycle of wireless transmissions can refer a measure of an amount of time that the wireless computing device 100 is active in wirelessly transmitting signals (e.g., periods 302a-k) relative to an amount of time that the wireless computing device 100 is idle (the periods in between periods 302a-k), within a predefined time interval 230. As an example, injecting idle times in the upload stream of the wireless communications module 102 may include replacing one or more periods that are active in wirelessly transmitting signals with periods that are idle or transmitting signals at a low power level. Although reducing the duty cycle of the wireless transmissions can reduce the total communications throughput of the wireless computing device 100 in the uplink direction, reducing the duty cycle of wireless transmissions may not affect the power level of signal transmissions from the wireless computing device 100.

The control module 104 may continuously perform a running average of the utilization of the wireless communications module 102 for determining whether the running average exceeds the threshold value 210. As an example, the running average may be performed by the control module 104 upon detecting instances of upload transmissions. Upon detecting instances of upload transmissions, the control module 104 may continuously measure the running average of the utilization of the wireless communications module 102. As described above, the running average may then be used to predict if a user is overexposed to RF energy (e.g., is above the SAR limit).

In an effort to avoid the use of proximity sensors in the wireless computing device 100, the above-described procedure may be used for detecting whether transmissions from the wireless computing device 100 provide a level of EM radiation that exceeds radiation-related thresholds (e.g., an indication of SAR exposure). By avoiding the use of proximity sensors, it may no longer be necessary to reserve valuable space within the wireless computing device 100 for such sensors, particularly as computing devices continue to decrease in size. In addition, rather than reducing power every time a user is detected to be proximate to the wireless computing device 100, the above-described procedure may reduce power only upon the average transmitter exposure exceeding the SAR limit. However, as the wireless computing device 100 may no longer have a proximity sensor for detecting proximity of a user, user proximity may be assumed (e.g., user's face proximate to wireless computing device 100) when a rolling average of transmissions from the wireless computing device 100 provide a level of EM radiation that exceeds radiation-related thresholds.

As an example, for a device having a proximity sensor, upon reaching a SAR level threshold, for example, when a user's face is 0 mm from the device, there may be a requirement to reduce the power from the wireless communications module by 3 dB. Referring back to wireless computing device 100 illustrated in FIG. 1, if wireless computing device 100 is transmitting less than 50% of the time, for example, over predefined time interval 230, the wireless computing device 100 is already at a −3 dB level for average transmitter exposure. As an example, if the wireless computing device 100 has an average of upload transmissions of 50% or more, than a power reduction may be triggered (e.g., −3 dB power reduction). Therefore, any user using 50% or more average upload (e.g., over the SAR test time period of 6 minutes), may have a transmitter power low enough so that even if the user is in close proximity of the wireless computing device 100, they are safeguarded. As a result, an assumption may be made that a user is in close proximity to the wireless computing device 100 when using 50% or more average upload.

Figure 4:
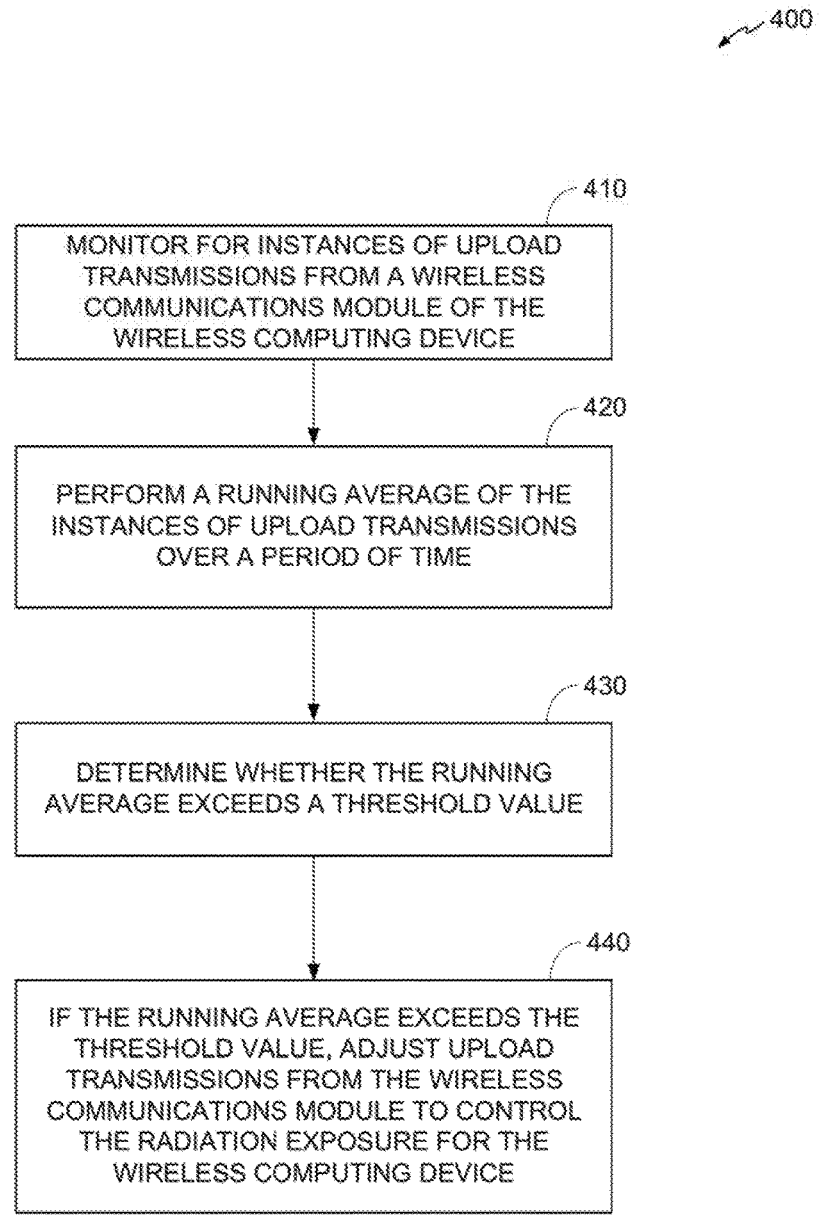
FIG. 4 is a flow diagram in accordance with an example of the present disclosure.

Referring to FIG. 4, a flow diagram is illustrated in accordance with various examples. The flow diagram illustrates, in a particular order, processes for controlling radiation exposure for a device (e.g., wireless computing device 100). The order of the processes is not meant to limit the disclosure. Rather, it is expressly intended that one or more of the processes may occur in other orders or simultaneously. The disclosure is not to be limited to a particular example.

A method 400 may begin and progress to 410, where the wireless computing device may monitor for instances of upload transmissions from a wireless communications module of the wireless computing device. Referring to FIG. 1, the control module 104 may monitor for the instances of upload transmissions from the wireless communications module 102.

Progressing to 420, the control module 104 may perform a running average of the instances of upload transmissions over a period of time. The period of time can be of any predefined length of time. As an example, the period of time can be the time interval associated with SAR measurements (e.g., 6 minutes). As an example, performing the running average generally includes updating the running average based on a product of the instances of upload transmissions and an RF power associated with the instances of upload transmissions. As an example, the RF power associated with the instances of upload transmissions may be a maximum RF power associated with the wireless communications module.

Progressing to 430, the control module 104 may determine whether the running average exceeds a threshold value. Threshold value may be indicative of a power level where wireless transmissions from the wireless communications module 102 may violate a radiation-related threshold, potentially exposing user to high levels of RF power. As an example, the running average may exceed the threshold value if a duty cycle of the upload transmissions over the period of time is at least 50%.

Progressing to 440, if the running average exceeds the threshold value, the control module 104 may adjust transmissions from the wireless communications module 102 to control the radiation exposure for the wireless computing device 100. Referring to FIG. 2, the running average 220 does not exceed the threshold value 210, so no adjustments may be required for the wireless transmissions from the wireless communications module 102. However, referring to FIG. 3, as the running average 320 exceeds the threshold value 210, adjustments may be required for the wireless transmissions from the wireless communications module 102. As an example, adjusting the transmissions from the wireless communications module 102 includes reducing a power level of the transmissions.

As an example, adjusting the transmissions from the wireless communications module 102 includes adjusting a duty cycle of the wireless transmissions. For example, the control module 104 may vary the amount of time of active transmissions from the wireless communications module 102 relative to the amount of time the wireless communications module 102 being idle (or transmitting at a low power level), within a predefined time interval. As an example, the control module 104 may decrease the amount of time of active transmissions relative to the amount of time the wireless communications module 102 being idle in order to reduce the total communications throughput of the wireless computing device 100 in the uplink direction.

It is appreciated that examples described may include various components and features. It is also appreciated that numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but to be accorded the widest scope consistent with the principles and novel features disclosed herein.

What is claimed is:

1. A method of controlling radiation exposure for a wireless computing device, comprising:
    monitoring for instances of upload transmissions from a wireless communications module of the wireless computing device;
    performing a running average of the instances of upload transmissions over a period of time;
    determining whether the running average exceeds a threshold value; and
    if the running average exceeds the threshold value, adjusting upload transmissions from the wireless communications module to control the radiation exposure for the wireless computing device.

2. The method of claim 1, wherein the running average exceeds the threshold value if a duty cycle of the upload transmissions over the period of time is at least 50%.

3. The method of claim 1, wherein performing the running average comprises:
    updating the running average based on a product of the instances of upload transmissions and a radio frequency (RF) power associated with the instances of upload transmissions.

4. The method of claim 3, wherein the RF power associated with the instances of upload transmissions is a maximum RF power associated with the wireless communications module.

5. The method of claim 1, wherein adjusting the upload transmissions from the wireless communications module comprises adjusting a duty cycle of the upload transmissions.

6. The method of claim 5, wherein adjusting the duty cycle of the upload transmissions comprises varying an amount of time of upload transmissions from the wireless communications module relative to an amount of time the wireless communications module being idle, within a predefined time interval.

7. The method of claim 1, wherein adjusting the updated transmissions from the wireless communications module comprises reducing a power level of the upload transmissions.

8. A wireless computing device, comprising:
    a wireless communications module; and
    a control module to:
        monitor for instances of upload transmissions from the wireless communications module;
        update a running average of instances of upload transmissions over a period of time, wherein the running average is based on a product of the instances of upload transmissions and a maximum radio frequency (RF) power associated with the wireless communications module;
        determine whether the running average exceeds a threshold value; and if the running average exceeds the threshold value, adjust upload transmissions from the wireless communications module to control the radiation exposure for the wireless computing device.

9. The wireless computing device of claim 8, wherein the control mod adjust the upload transmissions from the wireless communications module by adjusting a duty cycle of the upload transmissions.

10. The wireless computing device of claim 9, wherein the control module is to adjust the duty cycle of the upload transmissions by varying an amount of time of upload transmissions from the wireless communications module relative to an amount of time the wireless communications module being idle, within a predefined time interval.

11. The wireless computing device of claim 8, wherein the control module is to adjust the upload transmissions from the wireless communications module by reducing a power level of the upload transmissions.

12. A non-transitory computer-readable storage medium comprising programming instructions which, when executed by a processing resource, to cause a wireless computing device to:
monitor for instances of upload transmissions from a wireless communications module of the wireless computing device;
perform a running average of the instances of upload transmissions over a period of time;
determine whether the running average exceeds a threshold value, wherein the running average exceeds the threshold value if a duty cycle of the upload transmissions over the period of time is at least 50%; and
if the running average exceeds the threshold value, adjust upload transmissions from the wireless communications module to control the radiation exposure for the wireless computing device.

13. The non-transitory computer-readable storage medium of claim 12, wherein the instructions to cause the wireless computing device to adjust the upload transmissions from the wireless communications module comprises instructions to adjust a duty cycle of the upload transmissions.

14. The non-transitory computer-readable storage medium of claim 13, wherein the instructions to cause the wireless computing device to adjust the duty cycle of the upload transmissions comprises instructions to vary an amount of time of upload transmissions from the wireless communications module relative to an amount of time the wireless communications module being idle, within a predefined time interval.

15. The non-transitory computer-readable storage medium of claim 12, wherein the instructions to cause the wireless computing device to adjust the upload transmissions from the wireless communication module comprises instructions to reduce a power level of the upload transmissions.

* * * * *

UNITED STATES PATENT AND TRADEMARK OFFICE
CERTIFICATE OF CORRECTION

PATENT NO. : 9,853,750 B2
APPLICATION NO. : 15/501219
DATED : December 26, 2017
INVENTOR(S) : Lagnado et al.

Page 1 of 1

It is certified that error appears in the above-identified patent and that said Letters Patent is hereby corrected as shown below:

In the Claims

Column 8, Claim 7, Line 51, delete "updated" and insert -- upload --, therefor.

Column 8, Claim 8, Line 60, delete "of instances" and insert -- of the instances --, therefor.

Column 9, Claim 9, Line 6, delete "mod" and insert -- module is to --, therefor.

Column 10, Claim 15, Line 25, delete "communication" and insert -- communications --, therefor.

Signed and Sealed this
Twenty-ninth Day of May, 2018

Andrei Iancu
*Director of the United States Patent and Trademark Office*